(12) United States Patent
Vatnikov et al.

(10) Patent No.: US 10,084,652 B2
(45) Date of Patent: Sep. 25, 2018

(54) CUSTOMIZING NETWORK CONFIGURATION OF VIRTUAL MACHINES USING SUBNET MAPPING RULES

(71) Applicant: VMware, Inc., Palo Alto, CA (US)

(72) Inventors: Vitaly Vatnikov, Marblehead, MA (US); Robert Sullivan, Chelmsford, MA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 14/285,516

(22) Filed: May 22, 2014

(65) Prior Publication Data

US 2015/0341221 A1 Nov. 26, 2015

(51) Int. Cl.
*G06F 9/46* (2006.01)
*H04L 12/24* (2006.01)
*G06F 9/455* (2018.01)
*G06F 11/14* (2006.01)

(52) U.S. Cl.
CPC ...... *H04L 41/0893* (2013.01); *G06F 9/45558* (2013.01); *G06F 11/14* (2013.01); *G06F 11/1464* (2013.01); *G06F 2009/45595* (2013.01); *G06F 2201/815* (2013.01); *H04L 41/0654* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 6,772,204 B1* | 8/2004 | Hansen | H04L 41/0883 709/220 |
| 8,458,717 B1* | 6/2013 | Keagy | G06F 8/63 718/104 |
| 2002/0069267 A1* | 6/2002 | Thiele | H04L 41/0233 709/219 |
| 2010/0180014 A1* | 7/2010 | Kannan | H04L 29/12216 709/220 |

(Continued)

OTHER PUBLICATIONS

Laverick, Administering VMware Site Recovery Manager 5.0, 2012 (Year: 2012).*

(Continued)

*Primary Examiner* — Andy Ho
*Assistant Examiner* — Zhan Chen
(74) *Attorney, Agent, or Firm* — Patterson & Sheridan, LLP (57) ABSTRACT

Techniques disclosed herein provide disaster recovery IP customization based on rules associated with virtual networks that virtual machines (VMs) are connected to. In one embodiment, the rules are applied to each recovered VM to dynamically derive new TCP/IP settings at a recovery site based on TCP/IP settings used at a protected site and the virtual networks that the VMs is connected to at the protected and recovery sites. In particular, the rules may be defined in IP mapper objects associated with mappings between protected site networks and recovery site networks. During disaster recovery, the protected-site-to-recovery-site network mapping for a vNIC of a recovered VM is determined and rules that are defined in the IP mapper object associated with such a network mapping are evaluated to generate new TCP/IP settings.

20 Claims, 3 Drawing Sheets

(56) References Cited

U.S. PATENT DOCUMENTS

| | | | | |
|---|---|---|---|---|
| 2010/0287548 A1* | 11/2010 | Zhou | .................... | G06F 9/4856 |
| | | | | 718/1 |
| 2012/0173757 A1* | 7/2012 | Sanden | ............... | G06F 9/45558 |
| | | | | 709/238 |
| 2013/0198355 A1* | 8/2013 | Kalyanaraman | ........ | H04L 67/34 |
| | | | | 709/223 |
| 2014/0208329 A1* | 7/2014 | Abali | .................... | G06F 9/4856 |
| | | | | 718/104 |
| 2014/0325515 A1* | 10/2014 | Salmela | ................ | G06F 9/4856 |
| | | | | 718/1 |
| 2014/0359114 A1* | 12/2014 | Takamure | ........... | G06F 9/45558 |
| | | | | 709/224 |

OTHER PUBLICATIONS

Xu et al., Survivable Virtual Infrastructure Mapping in Virtualized Data Centers, 2012 (Year: 2012).*

VMware, Site Recovery Manager Adminstiration Guide, 2012 (Year: 2012).*

VMware vSphere Blog, [Retrieved on Jul. 27, 2015]. Retrieved from the Internet: <http://blogs.vmware.com/vsphere/2011/08/buil-ip-customization-in-srm-5.html>.

Veeam Backup & Replication User Guide Version 7.0, Vmware Environments, Sep. 2013. [Retrieved on Jul. 27, 2015]. Retrieved from the Internet: <http://files.hypervisor.fr/doc/veeam_backup_7_userguide_vmware.pdf>.

* cited by examiner

CUSTOMIZING NETWORK CONFIGURATION OF VIRTUAL MACHINES USING SUBNET MAPPING RULES

BACKGROUND

Virtualization management software allows multiple virtual machines (VMs) to execute on a single hardware computing platform. Each VM is an abstraction of a physical computing system and executes a "guest" operating system. Virtualization management software also manages how hardware computing resources are allocated to each VM. A group of hardware computing platforms may be organized as a cluster to provide the hardware computing resources for VMs. In a data center, it is common to see hundreds, even thousands, of VMs running on multiple clusters of host servers.

When a server cluster at one location fails, the virtual infrastructure at that location may be recovered at a remote location through a disaster recovery process. For example, the virtual infrastructure may be continuously replicated to the remote location prior to the disaster event, and after the disaster event the entire data center (or a portion thereof) may be restarted at the remote location. Commercially available disaster recover products include VMware® vCenter Site Recovery Manager.

Disaster recovery of a VM from one location to another typically requires reconfiguring network properties of the guest operating system (OS) of the VM to match the network configuration at the recovery site. This reconfiguration is referred to as VM IP customization and can involve modifying TCP/IP settings of the guest operating system such as static IP address, network mask, gateway, and domain name system (DNS) information, among other things. Traditional VM IP customization requires recovery configuration settings to be specified for each VM individually, which is a labor-intensive process that is tedious and can negatively affect user experience, manageability, and successful execution of disaster recovery.

DETAILED DESCRIPTION

Embodiments presented herein provide disaster recovery IP customization based on common rules associated with virtual networks to which virtual machines (VMs) are connected. As used herein, "virtual networks" are networks having links implemented via network virtualization, as opposed to physical connections between devices, and virtual networks permit VMs to be networked within a single host machine as well as across multiple host machines. In one embodiment, rules with virtual networks are applied to each recovered VM to dynamically derive new TCP/IP settings at a recovery site based on TCP/IP settings used at a protected site and the virtual networks that the VMs is connected to at the protected and recovery sites. Doing so eliminates the need for the user to specify desired TCP/IP settings on a per-VM basis prior to disaster recovery.

A VM's guest operating system (OS) configuration, including its TCP/IP settings, is typically preserved after disaster recovery as a result of storage replication. Such preserved TCP/IP settings are referred to herein as "old" TCP/IP settings and are used to generate "new" TCP/IP settings for the VM at the recovery site. A user may define IP mapping rules that describe how VMs which are connected to specific virtual networks at the protected and recovery sites, are to be reconfigured at the recovery site. In one embodiment, the IP mapping rules are defined in IP mapper objects that are associated with such mappings between protected site networks and recovery site networks, referred to herein as "network mappings." During disaster recovery, a site recovery application determines the protected site network and recovery site network for each Virtual Network Card (vNIC) of a recovered VM and retrieves the IP mapper object, if any, associated with this network mapping. The site recovery application then evaluates rule(s) defined in the IP mapper object to generate new TCP/IP settings for the recovered VM based on old TCP/IP settings. Each IP mapping rule may include a predicate that is invoked to check if the IP mapping rule is applicable based on the old TCP/IP settings, as well as a transform function used to resolve the new TCP/IP settings from the old TCP/IP settings. For example, the predicate may be a Boolean function specifying the conditions that the network attachment and subnet/parameters need to match, and if the predicate evaluates to true, the transform function may be applied to resolve new TCP/IP setting settings for the VM.

Figure 1:
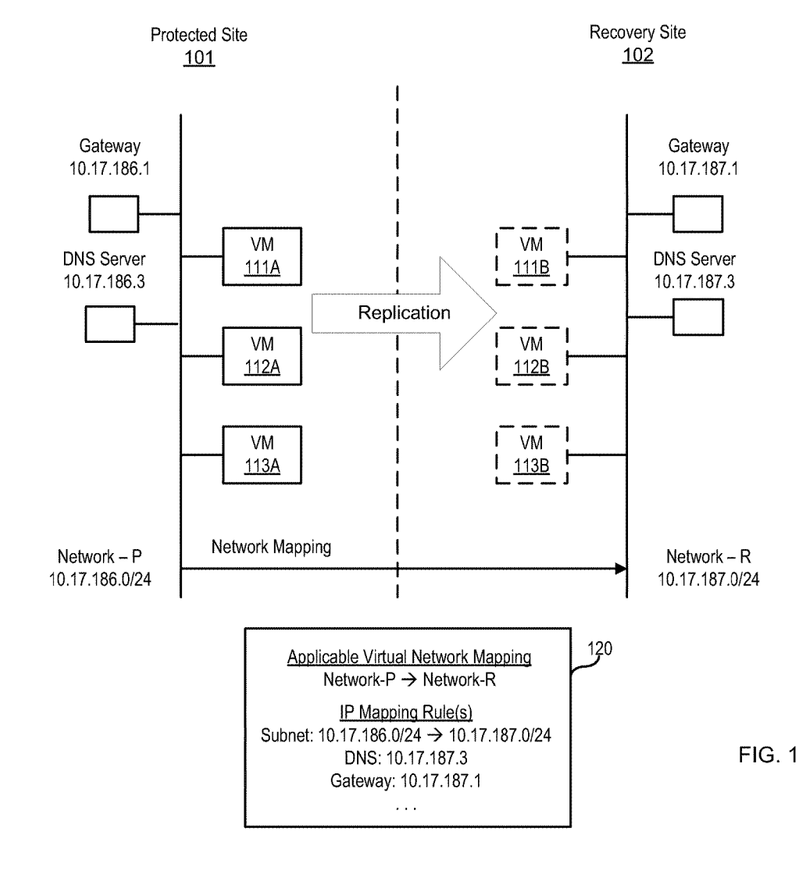
FIG. 1 illustrates an approach for customizing virtual machine network configurations during a disaster recovery process, according to an embodiment.

FIG. 1 illustrates an approach for customizing virtual machine network configurations during a disaster recovery process, according to an embodiment. As shown, virtual machines 111A-113A are replicated from a protected site 101 to a recovery site 102 for purposes of disaster recovery. Specifically, portions of disk storage, or other forms of persistent mass storage, that store the virtual disks of VMs 111A-113A may be replicated from protected site 101 to recovery site 102. When the entire protected site (or a portion thereof) fails as a result of, e.g., power outage, flood, or other disaster scenarios, VMs 111A-113A can be quickly restored and powered on as VMs 111B-113B at recovery site 102. Commercially available disaster recovery software includes Site Recovery Manager provided by VMware, Inc.®.

Illustratively, at protected site 101, VMs 111A-113A are connected to network P at IP subnet 10.17.186.0/24, and the guest OS IP and vNICs of VMs 111A-113A are configured to use DNS server 10.17.186.3 and gateway 10.17.186.1 on the IP subnet 10.17.186.0/24. The virtual infrastructure of a protected site such as protected site 101 typically includes multiple virtual networks using separate IP subnets. Each IP subnet requires VMs connected thereto to be configured to use specific IP addresses, network mask, gateway, and other IP parameters. Such configuration may be achieved using an auto-configuration protocol such as Dynamic Host Configuration Protocol (DHCP), or the configuration may be a static IP configuration specified by a user. It should be recognized that there is an inherent relationship between IP subnet configuration, i.e., the set of parameters such as IP address range, gateway, DNS server, etc. assigned to VMs sharing an IP subnet, and the virtual network used by a VM, which is reflected in the VM's guest OS network configuration and networks allocated the VM's vNICs. As discussed in greater detail below, embodiments disclosed herein take advantage of this relationship by associating IP mapping rules with virtual network mappings.

As shown, recovery site 102 includes network R with a different IP subnet 10.17.187.0/24 and corresponding gateway 10.17.187.1 and DNS server 10.17.187.3. A disaster recovery configuration may include information about network mapping(s), which specify which virtual networks on the recovery site should be used to reconnect recovery VMs connected to particular virtual networks at the protected site. As shown in FIG. 1, the network mapping is defined as Network-P-to-Network-R. As part of disaster recovery, the IP interfaces of the recovered VMs 111B-113B need to be reconfigured (i.e., customized) to match the network configuration settings of network R at recovery site 102 so that VMs 111B-113B can function correctly when connected to network R. This reconfiguration typically involves configuring TCP/IP parameters on the guest OS of the VM and is particularly required for VMs which do not have DHCP enabled. In traditional disaster recovery, the user specifies parameter values such as IP address, subnet prefix, gateway, DNS domain, DNS servers, and the like for virtual network interfaces (vNICs) of each VM 111B-113B, and the specified values are stored in a database. For example, VMware® Site Recovery Manager allows users to specify up to thirteen parameters for each vNIC for each VM. Then, during disaster recovery, a site recovery application (not shown) retrieves the appropriate values from the database and configures the TCP/IP settings of the VM with the retrieved values (e.g., by generating a configuration script and uploading the script to the VM for execution). However, this approach often requires a large set of records to be maintained in the database, and the manual creation of the configuration settings on a per-VM basis is labor intensive and error-prone. In addition, vNICs residing on the same IP subnet typically share many of their IP settings, so the per-VM configuration settings that are stored can be highly redundant. For example, in many cases, the only unique parameter for vNICs on the same IP subnet may be the IP address of the vNIC.

Embodiments disclosed herein provide a simplified IP customization technique that does not require specifying network configurations on a per-VM or per-VNIC basis. Rather than specifying configuration parameters associated with individual VMs/vNICs, the user instead specifies a common configuration object referred to herein as "IP mapper" that defines IP customization rule(s) applicable to a number of VMs failing over between specific protected site and recovery site virtual networks. An example IP mapper object 120 is depicted in FIG. 1 and discussed in greater detail below. Generally, IP mapper consolidates multiple VM IP customization settings into a single entity which captures IP address and other IP parameter assignment conventions for specific VM networks and IP subnets defined on them. Further, rather than storing explicit recovery configuration settings for individual VMs, the IP customization rule(s) defined by the IP mapper allows new configuration settings to be deduced from old settings. This allows users to specify a small set of common configuration IP mapper objects as opposed to a large set of discrete per-VM static recovery settings, thereby simplifying IP customization management in large-scale disaster recovery environments.

More specifically, each IP mapper defines a rule (or set of rules) on a specific network mapping (e.g., the Network-P-to-Network-R mapping). Use of network mappings is advantageous because IP subnet configurations are related to virtual networks, and the alternative to using networking mappings is likely a more complicated system based on IP address assignments. For each vNIC failing over according to a given network mapping (e.g., from Network-P to Network-R), a predicate (or predicates) of the rule (or set of rules) may be invoked to check if the rule is applicable to the vNIC. If the predicate when invoked resolves to true, then a resolver function in the rule may be invoked to generate new TCP/IP settings using the old TCP/IP settings. If the predicate when invoked resolves to false, then other IP mapping rules may be applied.

Illustratively, in IP mapper object 120 the IP mapping rule may be defined as: "each statically configured vNIC found at protected site's Network-P and IP subnet 10.17.186.0/24 and failing over to recovery site Network-R shall be placed at subnet 10.17.187.0/24 and use gateway 10.17.187.1 and DNS server 10.17.187.3," where the predicate for this rule defines the conditions that the network attachment and subnet/parameters need to match, namely the vNIC being connected to protected site's Network-P and configured at 10.17.186.0/24 and failing over to Network-R. It should be understood that wildcards ("any") may be used for Network-P and Network-R. During disaster recovery, the site recovery application identifies that a vNIC fails over from Network-P to Network-R, and retrieves IP mapper object 120 that is associated with mapping from Network-P to Network-R. The site recovery application further retrieves the current vNIC and TCP/IP configuration for the vNIC, and determines whether the retrieved configuration settings satisfy the rule predicate that the VM is connected to protected site's Network-P and configured at 10.17.186.0/24 and failing over to Network-R. If this predicate is satisfied, then the site recovery application resolves new parameter values for reconfiguring the VM, according to the rule's resolver function. In this example, the resolver function would map the old subnet 10.17.186.0/24 to the new subnet 10.17.187.0/24 and gateway 10.17.187.1 and DNS server 10.17.187.3. After determining these parameter values, the site recovery application generates (or modifies) a configuration script with the determined parameter values, and this script is then executed on the VM to apply the IP customization.

Figure 2:
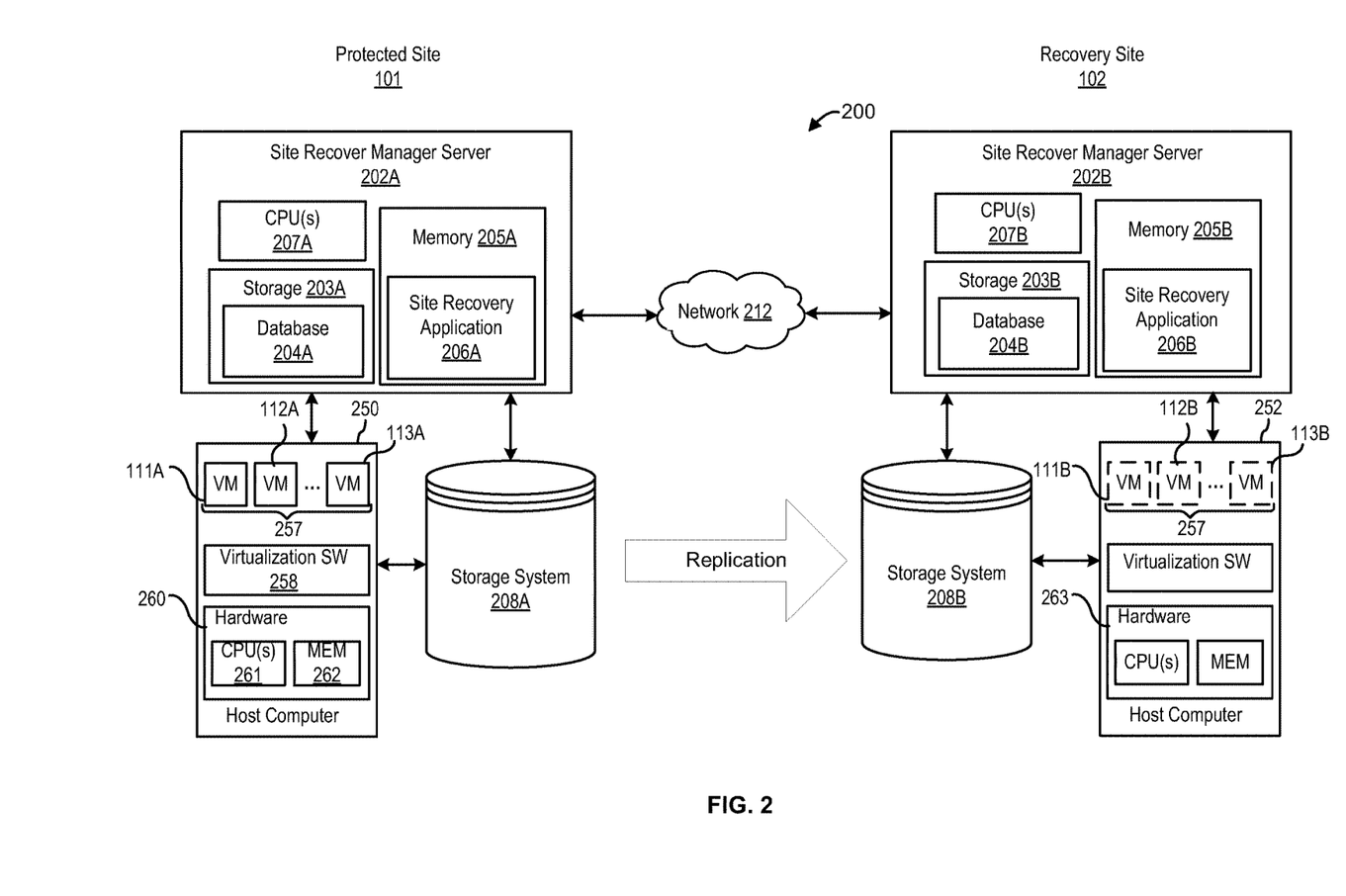
FIG. 2 illustrates a system including a protected and a recovery site for disaster recovery, according to an embodiment.

FIG. 2 illustrates a system 200 including protected site 101 and recovery site 102 for disaster recovery, according to an embodiment. As shown, protected site 101 includes a host computer 250, storage 208A, and a site recovery manager (SRM) server 202. Illustratively, at protected site 101, virtual machines 257 are instantiated on host computer 250. Although a single host computer 250 is shown, it should be understood that protected site 101 may also include multiple host computers, also referred to as a cluster. Host computer 250 includes virtualization software 258 and hardware 260 (e.g., host computer 250 includes one or more CPUs 261 and system memory 262), and the host computer 250 is coupled to a storage device 208A. Virtualization software 258 performs system resource management and virtual machine resource emulation. Depending on implementation, virtualization software 258 may be unhosted or hosted. Unhosted virtualization software generally relies on a specialized virtualization kernel for managing system resources, whereas hosted virtualization software relies on a commodity operating system—the "hosting operating system"—such as Windows, Mac OS X, or Linux to manage system resources. Each VM 257 includes a respective virtual disk which is stored in storage 208A. For purposes of disaster recovery, storage 208A, and in particular portions of storage 208A storing VM files such as virtual disk and configuration files (e.g., VMware .vmx files), are replicated to a storage 208B at recovery site 102. Various techniques are known for storage replication, including array-based replication techniques and VMware® vSphere Replication. The configuration files that are replicated may include configuration information and hardware settings of the VM. Guest OS configuration, including TCP/IP settings, are thus preserved in the configuration files after a disaster event.

One embodiment makes use of the fact that the TCP/IP settings are restored during recovery by automatically generating new TCP/IP setting for the VM based on the old TCP/IP settings. As discussed, a user (e.g., a network administrator) may define IP mapping rules, which describe relationships (mappings) between old and new IP subnet configurations and are each associated with a network mapping between protected and recovery sites. In particular, during a recovery configuration phase, which would occur before the disaster, the user specifies protected site's 101 virtual network(s) and their respective IP subnets that require failover in the case of a disaster recovery event. The user also specifies recovery site 102 network(s) and their respective IP subnets to which protected site's 101 virtual network(s) and IP subnets fail over. After specifying a network mapping between the protected and recovery sites, the user may create one or more IP mapping rules which describe how new static IP addresses and common TCP/IP parameters should be assigned to recovered VMs based on their current protected site TCP/IP configuration. That is, network mappings are between virtual networks, e.g., {Network-P, Network-R}, whereas IP mappings, also referred to as subnet mappings, are defined on top of a network mapping. Each network mapping may be associated with zero or more IP mapping rules. IP mapper objects act as containers of associations between network mappings and IP mapping rules and are stored as managed objects in databases 204A and 204B maintained in storage 203A and 203B by site recovery manager servers 202A and 202B, respectively. Databases 204A and 204B also store managed objects specifying the network mappings that define how VMs are connected at the recovery site 102 based on how the VMs were connected at protected site 101. Communications and synchronization between site recovery manager servers 202A-B may be handled in any feasible manner, and of each site recovery manager servers 202A-B is capable of running as a stand-alone server, such as after a disaster event in which one of site recovery manager servers 202A-B is unavailable.

During disaster recovery, site recovery application 206B, which is stored in memory 205B and executed by CPU(s) 207B of SRM server 202B, evaluates each recovered VM's IP configuration against the IP mapping rules associated with the VM's protected and recovery networks (i.e., associated with the network mapping for the VM). In one embodiment, site recovery application 206B powers on each successfully restored VM, which run in host computer 252 (or on multiple host computers) at the recovery site, and retrieves the current vNIC and TCP/IP configuration from the VM's guest OS. Site recovery application 206B then looks up IP mapping rules that have been configured for networks associated with the VM at the protected and recovery sites (i.e., the network mapping). If one or more IP mapping rules are identified, site recovery application 206 evaluates the retrieved guest OS TCP/IP settings against the identified rule(s). If the retrieved guest OS TCP/IP settings satisfy the predicate of one of the IP mapping rule(s), which specifies TCP/IP settings to which the IP mapping rule is applicable, site recovery application 206B generates new TCP/IP settings for the VM using a resolver function in the IP mapping rule. The VM is then reconfigured with the new TCP/IP settings.

Figure 3:
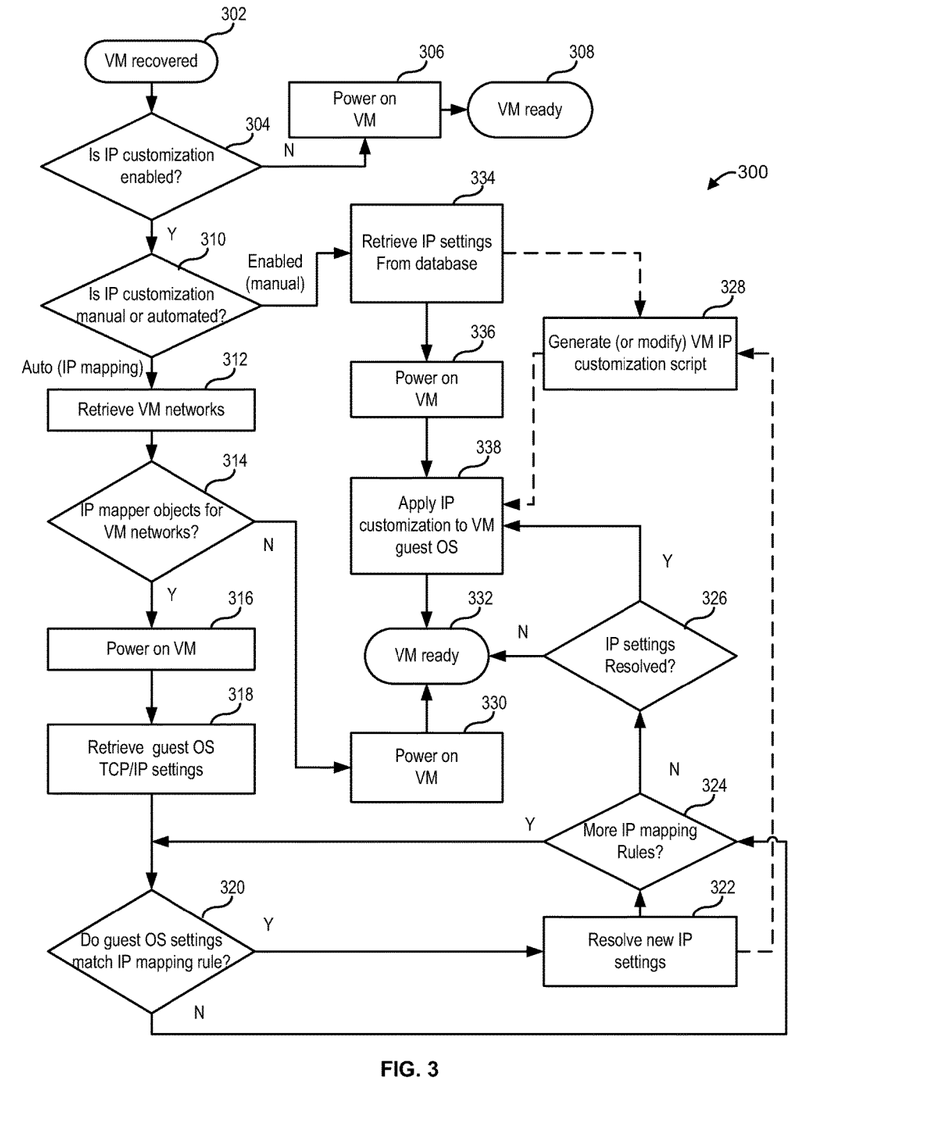
FIG. 3 illustrates a method for recovering a virtual machine with IP customization, according to an embodiment.

FIG. 3 illustrates a method 300 for recovering a virtual machine with IP customization, according to an embodiment. As shown, method 300 begins at step 302, where the VM has been recovered at the recovery site. At this point, files associated with the VM have been replicated to the recovery site, and other recovery steps, such as restoring the virtual disks of the VMs, may have been taken. In one embodiment, the VM may be ready to be powered on at the recovery site.

At step 304, the site recovery application checks the IP customization mode of the recovered VM to determine whether IP customization is enabled. Not every VM may require IP customization. For example, VMs with DHCP enabled may not require IP customization, as such VMs will dynamically acquire appropriate network configurations. In one embodiment, there may be three possible IP customization modes: an "automated" mode in which the site recovery application generates IP customization settings and configures the VM according to those settings, a "manual" mode in which the IP customization settings are predefined by a user, and a "disabled" mode which does not require IP customization. In such a case, the "automated" mode may be the default mode that can be manually overridden or disabled. If the IP customization mode for the VM is "disabled," i.e., not enabled, then the method 300 proceeds to step 306, where the site recovery application powers on the VM, and the VM is then ready for use at step 308.

On the other hand, if automatic IP customization is enabled, then at step 310, the site recovery application determines whether the IP customization is manual or automated. If the IP customization is automated, then at step 312, the site recovery application retrieves the VM's networks. As discussed, the virtual networks to which the VM is connected at the protected and recovery sites are specified during recovery configuration, before the disaster event. Such specified network information may be stored in a database, and the site recovery application may retrieve this information after the disaster event.

At step 314, the site recovery application determines whether an IP mapper object exists for the VM's networks. As discussed, IP mapper objects may also be stored in a database and retrieved therefrom. Each network mapping can be associated with an IP mapper object defining IP mapping rule(s) for VMs failing over according to the network mapping. If no IP mapper objects are identified at step 314, then the VM is simply powered on at step 330 and ready for use at step 332. If one or more IP mapper objects are identified, then the recovered VM is powered on at step 316 and at step 318, the site recovery application retrieves guest OS TCP/IP settings for IP customization purposes. Such guest OS TCP/IP settings may be retrieved by querying guest information via standard virtualization software interfaces. For instance, in the VMware® environment, such functionality is provided by the VMTools service running inside the guest OS.

At step 320, the site recovery application evaluates the guest OS TCP/IP settings against an IP mapping rule defined in the IP mapper object to determine whether the guest OS settings match the IP mapping rule. As discussed, a predicate (or predicates) of the rule may be invoked to check if the rule is applicable to a given vNIC of a VM. If the predicate yields true, then a resolver function in the rule may be invoked to generate new TCP/IP settings using old TCP/IP settings. An IP mapping rule may be defined in semi-formal terms as follows:

[001] IPMapping::={Np, Nr, Rules}
Rules::=Rule|Rules
Rule::={Predicate, Resolver}
Predicate::=M(S)→bool
Resolver::=R(S)→S', where Np is the protected site network, Nr is the recovery site network, S is the old (protected site) TCP/IP settings stored in the guest OS, S' is the new (recovery site) TCP/IP settings to be applied to the guest OS, M is a boolean function matching against TCP/IP settings, and R is a transform function for resolving the new TCP/IP settings S' from the old TCP/IP settings S.

The IP mapping is thus a rule or a set of rules defined on network mapping {Np, Nr}. For a VM failing over from old network Np to new network Nr, the predicate M is invoked to check if the rule is applicable to the VM. This check occurs at step 320, where the site recovery application evaluates the old guest OS TCP/IP settings against the IP mapping rule and determines whether the boolean function M (that indicates a match to the old IP settings) returns true.

In one embodiment, the IP mapping rule may operate on statically configured vNICs and DHCP-enabled vNICs are not be subject to IP customization. It should be understood, however, that this is only a typical use case. For example, the IP mapping rule may convert static interfaces to DHCP interfaces, or vice versa in an alternative embodiment.

If the old guest OS IP settings match the IP mapping rule, i.e., the predicate function M evaluates to true, then at step 322, the site recovery application resolves TCP/IP settings. That is, the site recovery application applies the transform function R discussed above to generate new TCP/IP settings S' for the recovery site based on the old TCP/IP settings S. For example, the predicate M may take as input parameters the old static IP address, network mask, and a source IP subnet Classless Inter-Domain Routing (CIDR) string, and check if the old IP address belongs to a specific IP subnet. In addition, the transform function R may take as input parameters the old IP address, network mask, and a target IP subnet CIDR string, and return a new IP address on the target subnet with all host bits of the original address preserved. This type of IP address conversion is sometimes referred to as "Re-IP-ing."

At step 324, the site recovery application determines whether there are additional IP mapping rules defined by the IP mapper object. If there are additional IP mapping rules, then the method 300 returns to step 320, where the guest OS TCP/IP settings are evaluated against another IP mapping rule. If there are no additional IP mapping rules, then the method 300 continues at step 326, where, if IP settings have been resolved, the site recovery application applies IP customization to the guest OS at step 338. Otherwise, the VM is ready for use at step 332.

As shown, the site recovery application generates (or modifies) a script at step 328 for applying IP customization to the guest OS. Customization scripts are commonly used to bring VMs to desired customized states. In one embodiment, the TCP/IP settings resolved at step 322 according to IP mapping rules are inputs to a customization script for IP customization. Such a customization script may be uploaded to the VM and executed therein at step 338 to customize the network settings of the guest OS. The VM is then ready for use at step 332.

Returning to step 310, if the site recovery application instead determines that IP customization is enabled but set to manual recovery, then the site recovery application retrieves IP customization settings from a database at step 334. That is, explicit IP customization settings are not subjected to IP mapping evaluation so that the automated IP customization discussed above is compatible with traditional IP customization that is manually defined on a per-VM basis. Similar to the case of automated IP customization, the site recovery application generates inputs to a script at step 328 for applying manual IP customization settings retrieved from the database. Such a script is then uploaded to the VM and executed therein at step 338, after which the VM is ready for use at step 332.

Although discussed above primarily with respect to disaster recovery (failover), techniques disclosed herein for IP customization may also be applied to migration of VMs between data centers and testing, among other things. Here, testing refers to a special mode of verifying a disaster recovery scenario, which can be rolled back. In such a case, VMs fail over to designated "test" networks at a recovery site, and IP subnet rules may be automatically transposed to those networks so that correctness of the rules can be tested prior to executing actual recovery.

Advantageously, techniques disclosed herein provide customized IP management for disaster recovery without the need for per-VM configuration. IP mapping rules according to techniques disclosed herein can instead be defined in a few IP mapper objects associated with network mappings. During disaster recovery, a site recovery application automatically resolves new IP configuration settings based on old IP configuration settings using the IP mapping rule(s) for the protected-site-to-recovery-site network mapping. As a result, the tedious and error-prone process of specifying exact TCP/IP settings for each VM is no longer required.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of configuring network settings of a virtual machine (VM) recovered or migrated from a first location to a second location, comprising:
    retrieving stored configuration information indicating a first virtual network to which the VM was connected at the first location and a second virtual network to which the VM is connected at the second location;
    identifying, based at least in part on the first virtual network and the second virtual network indicated in the retrieved configuration information, a rule for customizing network settings of a guest operating system (OS) of the VM at the second location, the rule being associated with the first and second virtual networks and providing a mapping between network settings of the guest OS of the VM at the first location and network settings of the guest OS of the VM at the second location;
    programmatically applying the rule to determine the network settings of the guest OS of the VM at the second location based at least in part on the network settings of the guest OS of the VM at the first location, wherein the network settings of the guest OS of the VM at the second location are different from the network settings of the guest OS of the VM at the first location; and
    configuring the VM recovered or migrated to the second location using the determined network settings.

2. The method of claim 1, wherein the application of the rule includes:
    evaluating a predicate to determine at least if the network settings of the guest OS of the VM at the first location matches predefined criteria; and
    evaluating a function to determine the network settings of the guest OS of the VM at the second location based at least in part on the network settings of the guest OS of the VM at the first location, if the predicate evaluation indicates a match.

3. The method of claim 2, wherein the predicate further includes predefined criteria that the VM was connected to the first virtual network at the first location and is connected to the second virtual network at the second location.

4. The method of claim 2, wherein the predefined criteria include that the VM was configured at a given IP subnet at the first location.

5. The method of claim 4, wherein the evaluation of the function includes preserving host bits of an IP address of the VM at the first location and modifying subnet bits of the IP address to match an IP subnet at the second location.

6. The method of claim 1, wherein the rule is one of a plurality of rules defined in a managed object associated with the first and second virtual networks the VM was connected to at the first location and is connected to at the second location, respectively.

7. The method of claim 1, wherein the configuring the VM includes:
    generating a script that makes configuration changes to the guest OS of the VM at the second location according to the determined network settings; and
    running the script in the VM.

8. The method of claim 1, further comprising, configuring an additional VM that is recovered or migrated at the second location based at least in part on manually specified network settings or powering on the additional VM without network settings changes.

9. The method of claim 1, wherein the network settings determined at the second location include subnet, gateway, and domain name system (DNS) server parameter values.

10. A non-transitory computer-readable storage medium embodying computer program instructions for configuring network settings of a virtual machine (VM) recovered or migrated from a first location to a second location, the computer program instructions implementing operations comprising:
    retrieving stored configuration information indicating a first virtual network to which the VM was connected at the first location and a second virtual network to which the VM is connected at the second location;
    identifying, based at least in part on the first virtual network and the second virtual network indicated in the retrieved configuration information, a rule for customizing network settings of a guest operating system (OS) of the VM at the second location, the rule being associated with the first and second virtual networks and providing a mapping between network settings of the guest OS of the VM at the first location and network settings of the guest OS of the VM at the second location;
programmatically applying the rule to determine the network settings of the guest OS of the VM at the second location based at least in part on the network settings of the guest OS of the VM at the first location, wherein the network settings of the guest OS of the VM at the second location are different from the network settings of the guest OS of the VM at the first location; and
configuring the VM recovered or migrated to the second location using the determined network settings.

11. The computer-readable storage medium of claim 10, wherein the application of the rule includes:
evaluating a predicate to determine at least if the network settings of the guest OS of the VM at the first location matches predefined criteria; and
evaluating a function to determine the network settings of the guest OS of the VM at the second location based at least in part on the network settings of the guest OS of the VM at the first location, if the predicate evaluation indicates a match.

12. The computer-readable storage medium of claim 11, wherein the predicate further includes predefined criteria that the VM was connected to the first virtual network at the first location and is connected to the second virtual network at the second location.

13. The computer-readable storage medium of claim 11, wherein the predefined criteria include that the VM was configured at a given IP subnet at the first location.

14. The computer-readable storage medium of claim 13, wherein the evaluation of the function includes preserving host bits of an IP address of the VM at the first location and modifying subnet bits of the IP address to match an IP subnet at the second location.

15. The computer-readable storage medium of claim 10, wherein the rule is one of a plurality of rules defined in a managed object associated with the first and second virtual networks the VM was connected to at the first location and is connected to at the second location, respectively.

16. The computer-readable storage medium of claim 10, wherein the configuring the VM includes:
generating a script that makes configuration changes to the guest OS of the VM at the second location according to the determined network settings; and
running the script in the VM.

17. The computer-readable storage medium of claim 10, the operations further comprising, configuring an additional VM that is recovered or migrated at the second location based at least in part on manually specified network settings or powering on the additional VM without network settings changes.

18. The computer-readable storage medium of claim 10, wherein the network settings determined at the second location include subnet, gateway, and domain name system (DNS) server parameter values.

19. A system, comprising:
a processor; and
a memory, wherein the memory includes a program, the program being configured to perform operations for configuring network settings of a virtual machine (VM) recovered or migrated from a first location to a second location, the operations comprising:
retrieving stored configuration information indicating a first virtual network to which the VM was connected at the first location and a second virtual network to which the VM is connected at the second location;
identifying, based at least in part on the first virtual network and the second virtual network indicated in the retrieved configuration information, a rule for customizing network settings of a guest operating system (OS) of the VM at the second location, the rule being associated with the first and second virtual networks and providing a mapping between network settings of the guest OS of the VM at the first location and network settings of the guest OS of the VM at the second location,
programmatically applying the rule to determine the network settings of the guest OS of the VM at the second location based at least in part on the network settings of the guest OS of the VM at the first location, wherein the network settings of the guest OS of the VM at the second location are different from the network settings of the guest OS of the VM at the first location, and
configuring the VM recovered or migrated to the second location using the determined network settings.

20. The system of claim 19, wherein the application of the rule includes:
evaluating a predicate to determine at least if the network settings of the guest OS of the VM at the first location matches predefined criteria; and
evaluating a function to determine the network settings of the guest OS of the VM at the second location based at least in part on the network settings of the guest OS of the VM at the first location, if the predicate evaluation indicates a match.

\* \* \* \* \*